United States Patent [19]

Bloomfield et al.

[11] Patent Number: 5,461,710
[45] Date of Patent: Oct. 24, 1995

[54] METHOD FOR PROVIDING A READILY DISTINGUISHABLE TEMPLATE AND MEANS OF DUPLICATION THEREOF IN A COMPUTER SYSTEM GRAPHICAL USER INTERFACE

[75] Inventors: Marc A. Bloomfield, Lighthouse Point; Scott A. Kliger, Boynton Beach, both of Fla.

[73] Assignee: International Business Machines Corporation, Armonk, N.Y.

[21] Appl. No.: 290,417

[22] Filed: Aug. 15, 1994

Related U.S. Application Data

[63] Continuation of Ser. No. 855,366, Mar. 20, 1992, abandoned.

[51] Int. Cl.[6] ............................................. G06F 3/14
[52] U.S. Cl. ........................... 395/161; 395/158; 395/159
[58] Field of Search .................................. 395/100, 155, 395/156, 157, 158, 159, 161

[56] References Cited

U.S. PATENT DOCUMENTS

| | | | |
|---|---|---|---|
| 4,656,603 | 4/1987 | Dunn | 395/159 X |
| 5,079,695 | 1/1992 | Dysart et al. | 395/100 X |
| 5,287,447 | 2/1994 | Miller et al. | 395/159 X |

OTHER PUBLICATIONS

Microsoft Windows User's Guide (Trademark of Microsoft Corporation), 1990, pp. 88–91 & 94.
Microsoft Windows User's Guide (Trademark of Microsoft Corporation), 1990, pp. 449–456.
Deskset Environment Reference Guide (Trademark Of Sun Microsystems, Inc.), 1990, pp. 5–7, 17–18, 40 & 81.
IBM Corporation, "Getting Started, IBM Operating System/2 Standard Edition," Version 1.2, Sep. 1989, pp. 21–27, 71–73 and 90–91.
WordPerfect Corporation, "WordPerfect for IBM Personal Computer," Version 5.0, 1989, pp. 372–377.

*Primary Examiner*—Heather R. Herndon
*Assistant Examiner*—Cliff Nguyen Vo
*Attorney, Agent, or Firm*—Bruce D. Jobse; Andrew J. Dillon

[57] ABSTRACT

The foregoing has described a method of providing a template in a computer system graphical user interface by supplying a visual cue which readily identifies the template and by supplying a direct template manipulation feature to increase the ease by which users can create objects. The template visual cue is provided to distinguish an instance of an object from its template form. Any object of any class which contains data and settings can be made into a template by turning on its template setting. When an object becomes a template, the icon which represents it is immediately altered. In particular, its icon becomes miniaturized or scaled down and superimposed on top of a normal size icon which resembles a pad of sheets of paper. This metaphor or visual cue is used to symbolize a stack of objects, of which new objects can be peeled off the top of the stack. With a drag and drop mouse action, a new object can be picked off of a template stack and dropped into any folder. A new object exhibiting the same class, data and settings defined by the template will be created in the folder at the mouse pointer position at the time of the drop.

5 Claims, 7 Drawing Sheets

METHOD FOR PROVIDING A READILY DISTINGUISHABLE TEMPLATE AND MEANS OF DUPLICATION THEREOF IN A COMPUTER SYSTEM GRAPHICAL USER INTERFACE

This is a continuation of application Ser. No. 07/855,366, filed Mar. 20, 1992, now abandoned.

CROSS-REFERENCE TO RELATED APPLICATIONS

The present patent application is one of a group of copending applications which concern the same overall personal computer system but which individually claim different inventive concepts embodied in such personal computer system. These related patent applications were filed on the same date, namely Mar. 20, 1992, are specifically incorporated by reference herein, and are more particularly described as follows:
(1) Application Ser. No. 07/854,171, filed Mar. 20, 1992, entitled "Method for Providing Conditional Cascading in a Computer System", now U.S. Pat. No. 5,425,140, the inventors being Bloomfield et al;
(2) Application Ser. No. 07/854,257, filed Mar. 20, 1992, entitled "Method for Providing Size Adjustment for a Maximized Window in a Computer System Graphical User Interface", the inventor being Bloomfield; and
(3) Application Ser. No. 07/855,369, filed Mar. 20, 1992 entitled "Palette Manager In A Graphical User Interface Computer System", now U.S. Pat. No. 5,571,844, the inventors being Bloomfield et al.

FIELD OF THE INVENTION

This invention relates to personal computer systems and in particular to a method and device for improving a graphical user interface (GUI) on a personal computer system.

BACKGROUND DISCUSSION

Personal computer systems in general and IBM personal computers in particular have attained widespread use for providing computer power to many segments of today's modern society. Personal computer systems can usually be defined as a desktop, floor standing, or portable microcomputer that consists of a system unit having a single system processor, a display monitor, a keyboard, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses.

Examples of such personal computer systems are IBM's PERSONAL COMPUTER AT, IBM's PERSONAL SYSTEM/2 Models 25, 30, 35, 40 SX, 55 SX, 57 SX, 70, 80, 90 and 95, and IBM PERSONAL SYSTEM/1 computers. These systems can be classified into two general families. The first family, usually referred to as Family I Models, use a bus architecture exemplified by the IBM PERSONAL COMPUTER AT and other "IBM compatible" machines. The second family, referred to as Family II Models, use IBM's MICRO CHANNEL bus architecture exemplified by IBM's PERSONAL SYSTEM/2 Models 55 SX through 95. Beginning with the earliest personal computer system of the Family I models, such as the IBM Personal Computer, it was recognized that the operating system would be of utmost importance. Realizing that market acceptance was a primary goal, IBM chose a rather simple text oriented operating system which was suited for the level of hardware technology of the time. The operating system chosen was named DOS which is the acronym for disk operating system. The limited objectives for DOS at the time were non-cryptic commands, English language error messages (instead of error codes, small memory size (12 Kbyte) and reasonable performance. DOS served well for the Family I machines and even into the basic Family II models, but as memory and hardware prices declined and performance increased a more user friendly intuitive operating system was needed. Beginning in 1986, IBM started development of a graphical user interface (GUI) designed to mask the complexity of the hardware technology advances and present to the user an intuitive, flexible, and easy-to-use system. This operating system was named OS/2 and was developed for the more advanced technology of the Family II models.

Additionally, other manufactures have investigated and used other types of GUI systems. One of the earliest in the personal computing area was Xerox's STAR system that presented the user with icons representing a particular operation or software application. Later, APPLE's Macintosh system added features such as windows and drag and drop to further the intuitive nature of the graphical user interface for APPLE's line of computers. Presently, MICROSOFT's WINDOWS provides a graphical user interface on IBM compatible machines.

With GUI systems, the computer system is controlled using a pointing device such as a mouse. The pointing device controls the location of a pointer that appears on the screen of the computer's display device. Elements on the screen such as icons, which are graphical representations of various modules such as disk drives, applications and documents, or windows, which are rectangular areas on the screen in which applications or documents can be viewed, may be manipulated using the mouse. In this way, the underlying devices which the elements represent may be controlled.

As GUI systems developed, producing the underlying elements such as windows and icons has become well known. In fact, publicly available tools such as icon and window editors are now available to actually create the visual display. For example, Conklin, OS/2 Notebook, (Microsoft Press, 1990) pp. 159–255 discusses OS/2 software tools.

As new models of the personal computer family were introduced, OS/2 had to be updated and enhanced. One of the major features of the OS/2 Version 2.0 operating system in which the present invention is incorporated is a workplace shell featuring a desktop metaphor. Briefly, the desktop metaphor presents the user with the look of a desktop. For example, files can appear as icons grouped together into folders. Folders can be placed into a predefined space such as a window. Application programs appear as unique icons that can be activated when a pointer, positioned by the movement of a mouse over the icon, is energized usually by double clicking one of the mouse buttons.

Word processing applications that run on conventional operating systems have permitted the user to create form documents which serve as a pattern for future documents. One way to create a copy of such a form document for editing is for the user to manually make a copy of such a form document by inputting a "COPY" text command on the command line or to use a COPY command selected from a menu in a particular graphical user interface. Conventional style sheets in word processors provide one type of document which can be used as a pattern or starting point for future documents. Such style sheets can preserve text as well as desired formatting. Unfortunately, creating duplicate documents and objects in a graphical user interface by conventional techniques is often a process with a significant number of steps. If a copy is made of an object represented by an icon and the copy of the object is represented by the same icon as the original, it may be difficult to distinguish the original object from the copied object.

SUMMARY OF THE INVENTION

One object of the present invention is to provide a means for facilitating the duplication of objects such as form documents and other entities in a graphical user interface.

Another object of the present invention is to provide a template which is readily distinguishable from other objects on the desktop of a graphical user interface Yet another objective of the present invention is to enhance the ease of use of a graphical user interface.

In accordance with one embodiment of the present invention, a method for providing a template in a computer system graphical user interface is disclosed including the steps of creating an object with desired properties in the computer system and displaying a representation of the object on a display screen in the form a first icon. The method also includes the steps of providing user input to the computer system to indicate that the object is desired to be a template and storing in a memory in the computer system the properties and contents of the object as a template. The method further includes the step of indicating that the object is a template by displaying on the screen the first icon associated with the object within a second icon, the first and second icons being together designated as the template icon, the template represented by the template icon retaining the desired properties of the object.

The method of the invention still further includes the steps of selecting the template icon by placing a pointer on the template icon with a pointing device and dragging the template icon with the pointer. The method also includes the step of changing the pointer to a third icon substantially the same as the first icon within said template icon when the dragging step begins. The method further includes the steps of storing in the computer system a second object with properties identical to the template the third icon being representative of a second object, and displaying the third icon on the computer screen at a point where the user ceases dragging said third icon.

BRIEF DESCRIPTION OF THE DRAWINGS

The foreground aspects and other features of the present invention are explained in the following written description, taken in connection with the accompanying drawings, wherein.

DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appending claims.

I. Operation Of The Computer System—General

Figure 1:
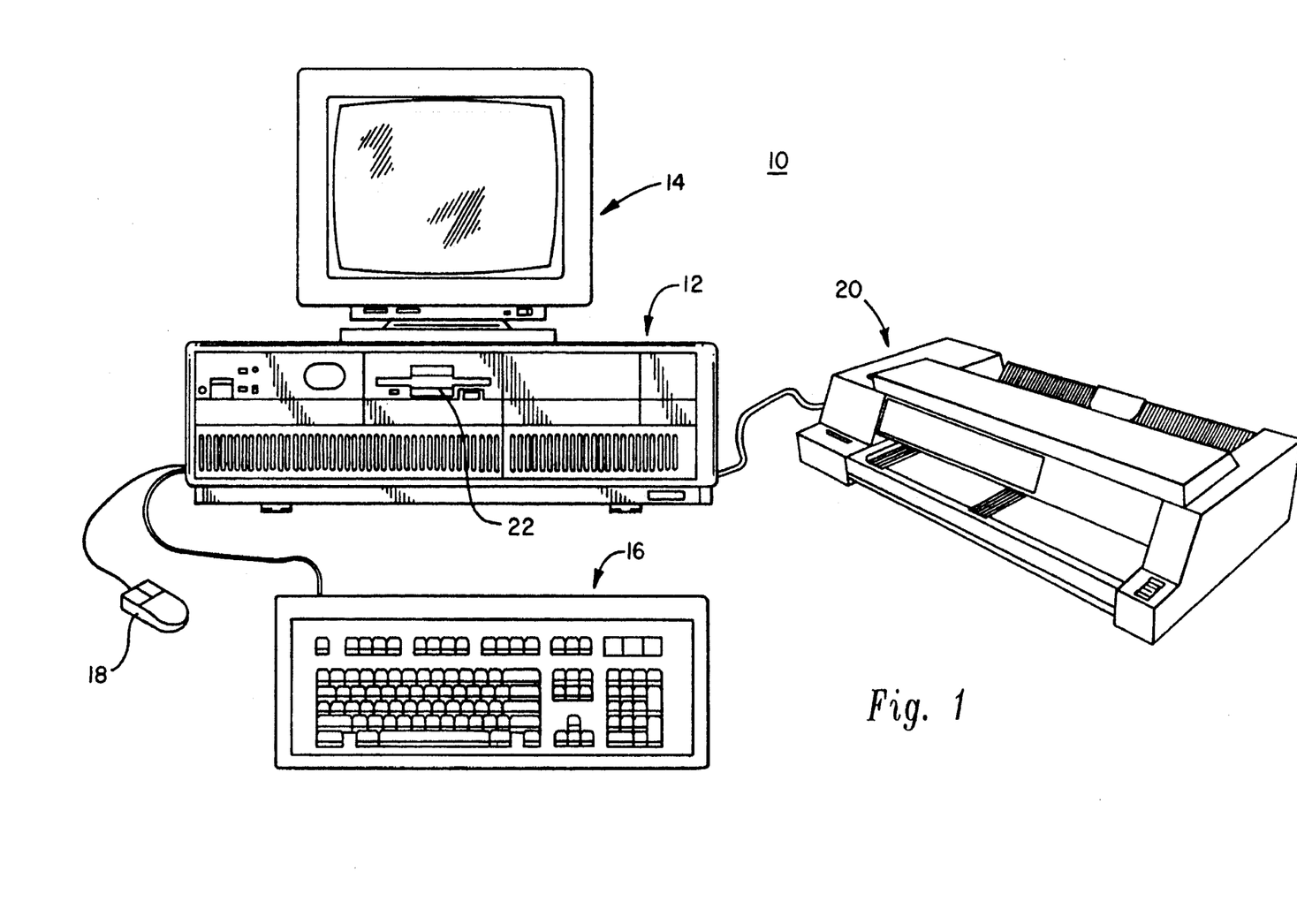
FIG. 1 shows a personal computer system in which the present invention can be employed.

Prior to relating the methodology and structure of the present invention, a summary of the operation in general of a typical personal computer system may merit review. Referring now to the drawings, and in particular to FIG. 1, there is shown a Personal Computer System 10 in which the present invention can be employed. As shown, the Personal Computer System 10 comprises a number of components which are interconnected together. More particularly, a system unit 12 is coupled to and can drive an optional monitor 14 (such as a conventional video display). A system unit 12 can also be optionally coupled to input devices such as a PC keyboard 16 or a mouse 18. Mouse 18 includes right and left buttons (not shown). The left button is generally employed as the main selector button and is alternatively referred to as the first mouse button or mouse button 1. The right button is typically employed to select auxiliary functions as explained later. The right mouse button is alternatively referred to as the second mouse button or mouse button 2. An optional output device such as a printer 20 can also be connected to the system unit 12. Finally the system unit 12 may include one or more mass storage devices such as the diskette drive 22.

As will be described below, the system unit 12 responds to input devices such as the PC keyboard 16, the mouse 18, or local area networking interfaces. Additionally, input/output devices, such as the diskette drive 22, display 14, printer 20, and local area network communication system are connected to the system unit 12 in a manner well known. Of course, those skilled in the art are aware that other conventional components can also be connected to the system unit 12 for interaction therewith. In accordance with the present invention, the computer system 10 includes a system processor that is interconnected to a random access memory (RAM), a read only memory (ROM), and a plurality of I/O devices.

In normal use, the personal computer system can be designed to give independent computing power to a small group of users as a server or a single user and is inexpensively priced for purchase by individuals or small businesses. In operation, the system processor functions under an operating system, such as IBM's OS/2 operating system or DOS. This type of operating system includes a BIOS interface between the I/O devices and the operating system. BIOS, which can be stored in a ROM on a motherboard or planar, includes diagnostic routines which are contained in a power on self test section referred to as POST.

II. Operation Of The Computer System—In More Detail

Figure 2:
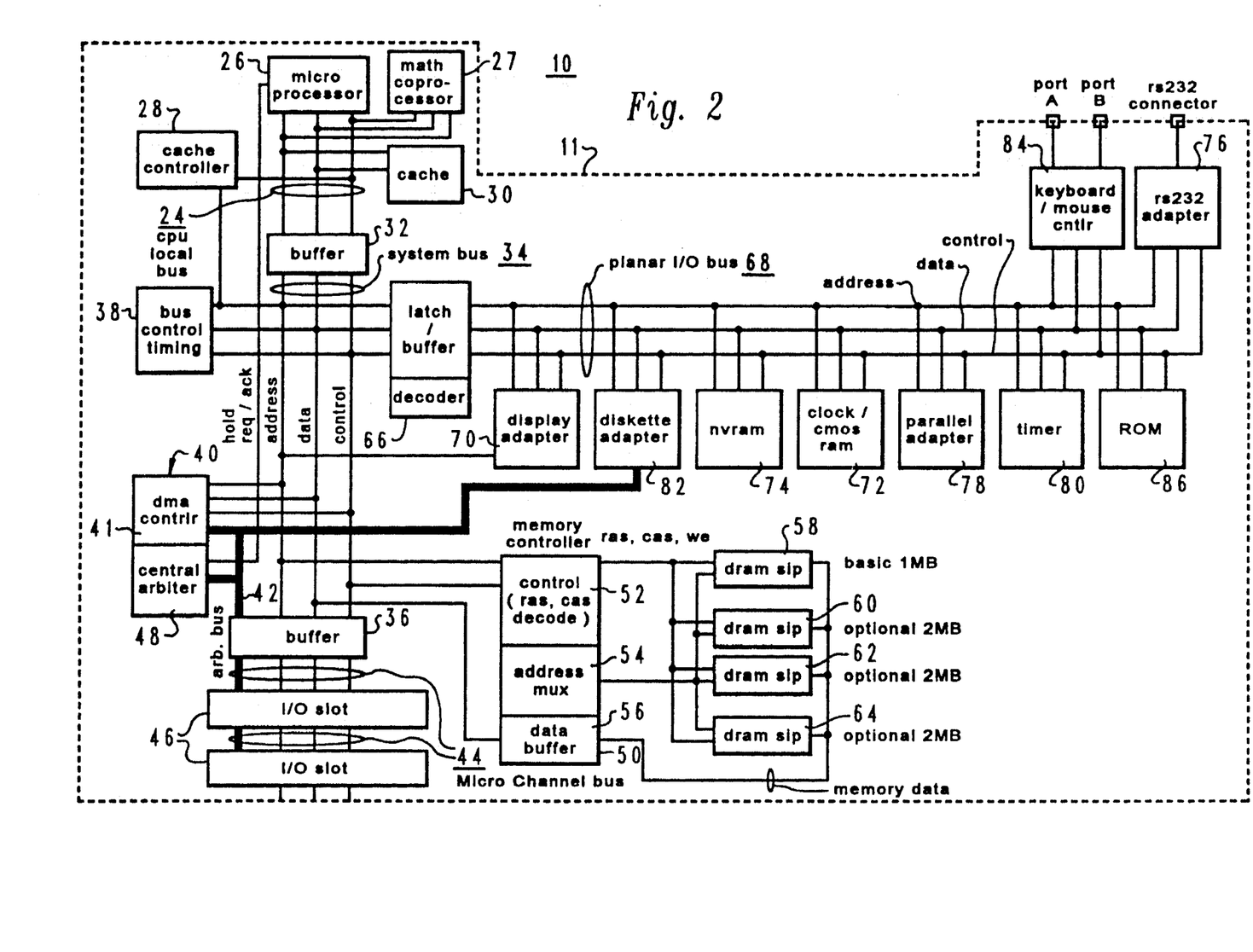
FIG. 2 shows a system block diagram for the personal computer system of FIG. 2.

Prior to relating the above structure to the present invention, a summary of the operation in general of the Personal Computer System 10 may merit review. Referring to FIG. 2, there is shown a block diagram of the Personal Computer System 10 illustrating the various components of the Computer System 10 in accordance with the present invention. FIG. 2 further illustrates components of the planar 11 and the connection of the planar 11 to the I/O slots 46 and other hardware of the Personal Computer System 10. Connected to the planar 11 is the system processor 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286 or 80486 microprocessor. These particular microprocessors can operate in a real addressing mode or a protected addressing mode. Each mode provides an addressing scheme for accessing different areas of the microprocessor's memory.

Returning now to FIG. 2, the CPU local bus 24 (comprising data, address and control components) provides for the connection of a microprocessor 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a DMA unit 40. The DMA unit 40 is comprised of a central arbitration unit 48 and a DMA controller 41. The buffer 36 provides an interface between the system bus 34 and an optional feature bus such as the Micro Channel bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. Also connected to system bus 34 is a memory control unit 50 which is comprised of a memory controller 52, an address multiplexer 54, and a data buffer 56. The memory control unit 50 is further connected to a random access memory as represented by the RAM module 58. The memory controller 52 includes the logic for mapping addresses to and from the microprocessor 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between the system bus 34 and a planar I/O bus 68. The planar I/O bus 68 includes address, data, and control components respectively. Coupled along the planar bus 68 are a variety of I/O adapters and other peripheral components such as the display adapter 70 (which is used to drive an optional display 14), a clock 72, nonvolatile RAM 74 (hereinafter referred to as NVRAM), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

The clock 72 is used for time of day calculations. NVRAM 74 is used to store system configuration data. That is, the NVRAM will contain values which describe the present configuration of the system. For example, NVRAM contains information which describe the capacity of a fixed disk or diskette, the type of display, the amount of memory, etc. Of particular importance, NVRAM will contain data which is used to describe the system console configuration; i.e. whether the PC keyboard is connected to the keyboard/mouse controller 84, a display controller is available or the ASCII terminal is connected to the RS232 adapter 76. Furthermore, these data are stored in NVRAM whenever a special configuration program is executed. The purpose of the configuration program is to store values characterizing the configuration of this system to NVRAM which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

III. OS/2 Version 2 Operating System—General

Figure 3:
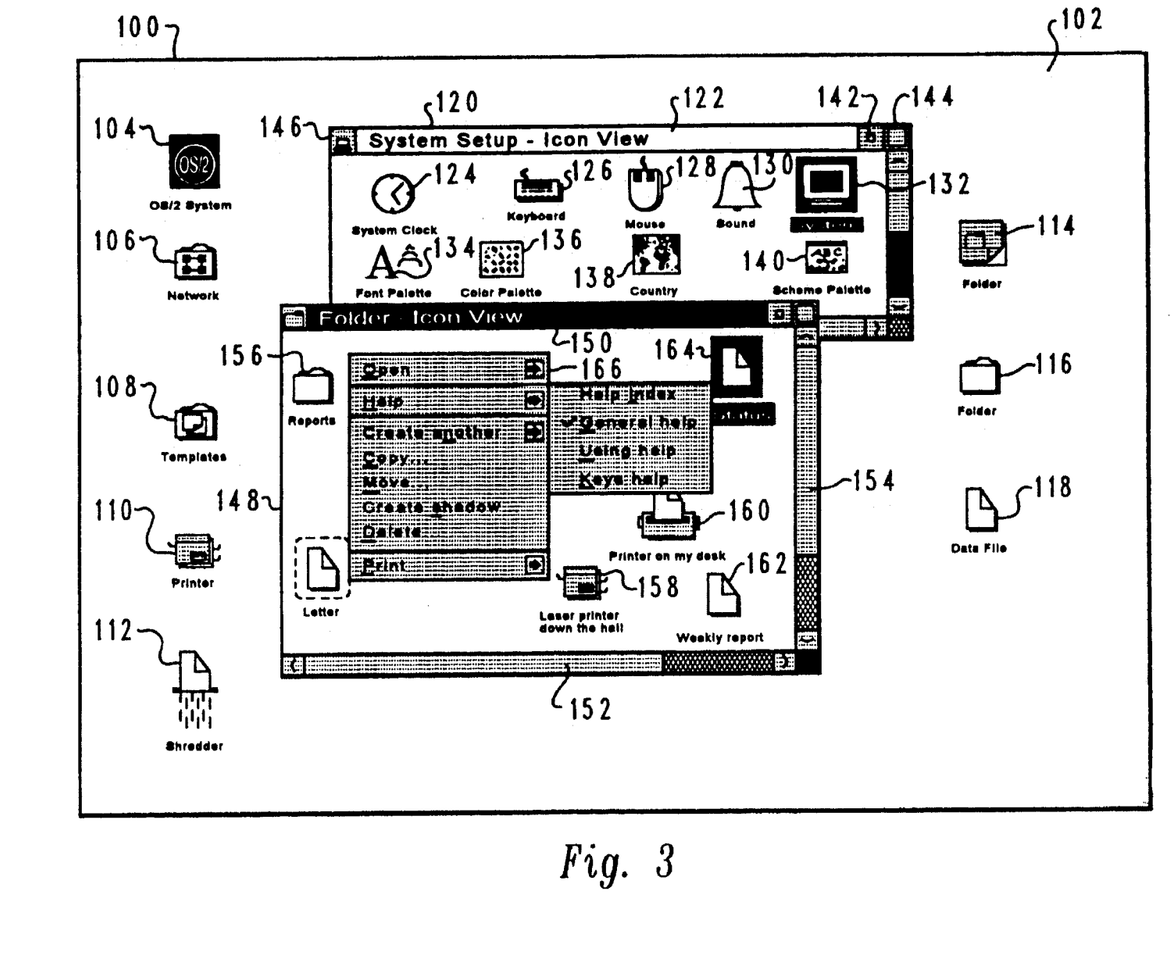
FIG. 3 is a screen representation of the desktop employed in the present invention.

It may be appropriate at this point to briefly review selected features of the OS/2 2.0 GUI. FIG. 3 illustrates a typical display screen 100 which appears when using OS/2 2.0. The viewing area within screen 100 is referred to as desktop 102. Desktop 102 includes a plurality of user selectable icons which are conveniently selected by double clicking the left button of the mouse. Each icon represents an application, function or file storage area which the user can select. For example, as seen in FIG. 3, desktop 102 includes an OS/2 System icon 104, a Network icon 106, a Templates icon 108, a Printer icon 110, a Shredder icon 112, a Folder icon 114, another Folder icon 116 and a Data file 118.

When the user selects an icon by double clicking the same, the corresponding function is activated and the icon becomes highlighted. For example, when the OS/2 System icon 104 is selected on desktop 102, OS/2 System icon 104 becomes highlighted as illustrated in FIG. 3. When OS/2 System icon 102 is so selected, a corresponding window 120 of further possible selections is displayed on desktop 102. More specifically, window 120 includes a title bar 122 in which the name of the selected window is designated in text as "System Setup—Icon View". In this particular example, the selectable icons appearing within System Startup window 120 includes a System Clock icon 124, a Keyboard icon 126, a Mouse icon 128, a Sound icon 130, a System icon 132, a Font Palette icon 134, a Color Palette 136, a Country icon 138 and Scheme Palette 140.

The upper right corner of window 120 includes a small box 142 which, if selected by the user, minimizes window 120, thus dismissing window 120 and returning window 120 to the icon 104 representation thereof. The upper right corner of window 120 also includes a box 144, larger than box 142 and which if selected by the user, maximizes window 120, thus causing window 120 to occupy substantially all of desktop 102.

The icon representation 146 appearing in the upper left corner indicates the type of window to which it corresponds. For example, window 120 is a system setup window; accordingly, the icon appearing in the upper left corner of window 120 is representative of the System icon. Had system clock icon 124 been selected, the icon appearing in the upper left corner of its window would be representative of a clock.

Since title bar 122 of window 120 is depicted in white or "not-highlighted", this indicates the window 120 is not presently selected or active. Rather the user has clicked on and selected Folder 114 as indicated by its highlighted nature. When Folder 114 was so selected, a corresponding Folder window 148 was opened on desktop 102 in overlapping fashion with respect to the earlier opened System Setup window 120. The title bar 150 of window 148 indicates the title of window 148 as being "Folder-Icon View". It is noted that title bar 150 of window 148 is highlighted, thus indicating that window 148 is presently the active window.

Window 148 includes a horizontal scroll bar 152 which can be engaged by the user to scroll through the contents of window 148 from left to right and from right to left all within the particular viewing area defined by the chosen dimensions of window 148. Window 148 also includes a vertical scroll bar for scrolling through the window contents vertically. Other windows generated by the operating system also include this feature. For purposes of example, window 148 includes a Reports icon 156, a Laser Printer Down The Hall icon 158, a Printer On My Desk icon 160, a Weekly Report icon 162 and a Status icon 164.

IV. The Template in OS/2 Version 2

Figure 4:
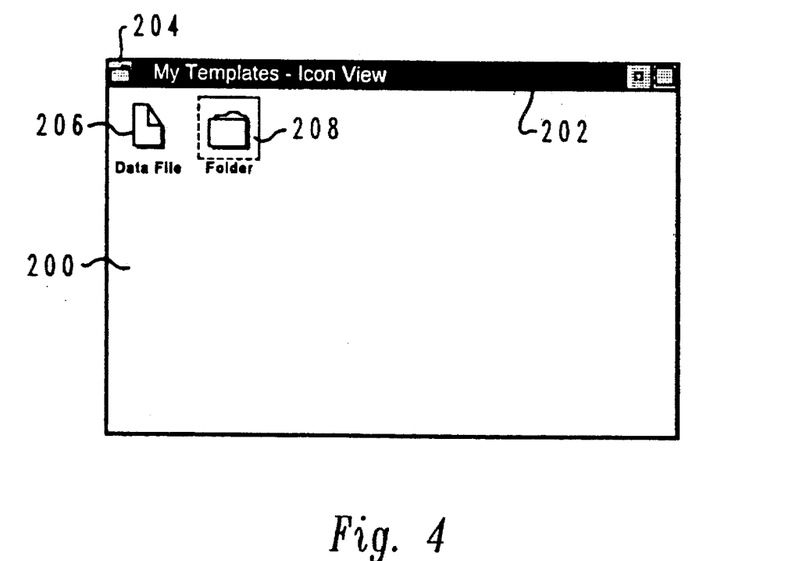
FIG. 4 is a screen representation of folder have objects therein.

FIG. 4 shows a window 200 which is situated on the desktop (not shown) of the graphical user interface. Window 200 includes title bar 202 entitled "My Templates—Icon View". From the folder icon 204 appearing in the upper left corner of window 200 it is seen that window 200 represents a folder. Window 204 includes a Data File icon 206 representing a data file and a Folder icon representing another folder within the My Templates folder 200.

The discussion of certain graphical user interface related definitions may be helpful at this point. Data file 206 and folder 208 are examples of objects. An object is an entity which is stored in the computer system and which is represented by an icon on the desktop. Other examples of objects are printer configurations, color palettes and so forth. Each object is represented by a respective icon and each object exhibits certain properties. Examples of the properties exhibited by an object are its name, its icon, its font, its selected printer and its text contents. Another example of a property of an object is the particular application with which it is associated. For example, a word processing document object would be associated with the word processing application which generated that document object. In this manner, when the user double clicks on a word processing document, the operating system has the ability to call the word processing application which generated the document object.

For purposes of discussion it is assumed that the user has created a data file 206 or folder 208 and now desires to use one of these objects as a pattern for creating other objects. The data file or folder has been manipulated by the user and is outfitted with properties (text language, name, etc.) which the user desires for future use. For example, it is assumed that the user would like to use folder 208 as a pattern for creating additional like folders with the same properties as folder 208.

FIG. 4, in summary, shows a standard folder containing two objects namely a data file and a folder. Each of these objects represents a distinct physical object including class, data and settings. In this usage, "class" refers to the type of the object, namely whether it is a file, palette, printer or other object type, for example.

Figure 5:
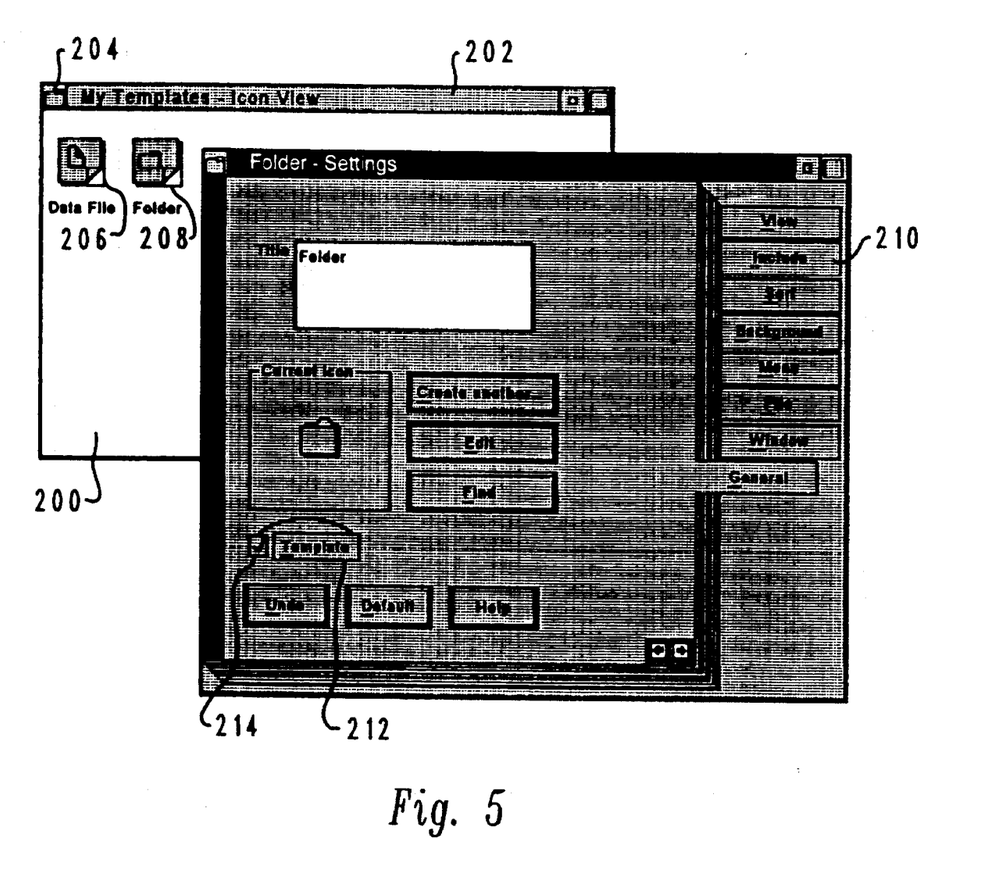
FIG. 5 is a screen representation of a folder with the settings option activated.

Continuing on to FIG. 5, the user moves the pointer to folder 208 using a pointing device such as a mouse and then clicks on folder 208. The operating system then paints a Folder-Settings window 210 in overlapping relationship with respect to window 200 as seen in FIG. 5. To make folder 208 into a template, the user clicks on the template check box 212 causing a check mark 214 to be placed in check box 212. A file designated as the template file is then stored in the computer system. The template file contains all of the contents and properties of folder 208, the original object.

FIG. 5, in summary, shows the same folder as shown in FIG. 4 with the same objects except with the template turned on. FIG. 5 also shows a settings window for one object, namely the folder object. This example shows that the check box is checked indicating that the template property is set. The icons 206 and 208 in the folder are shown with the template folder visual cue which is formed by a scaled down version of their original icons superimposed on top of an icon representative of a pad of papers, the top sheets with a corner slightly peeled up, as discussed later in more detail.

Figure 6:
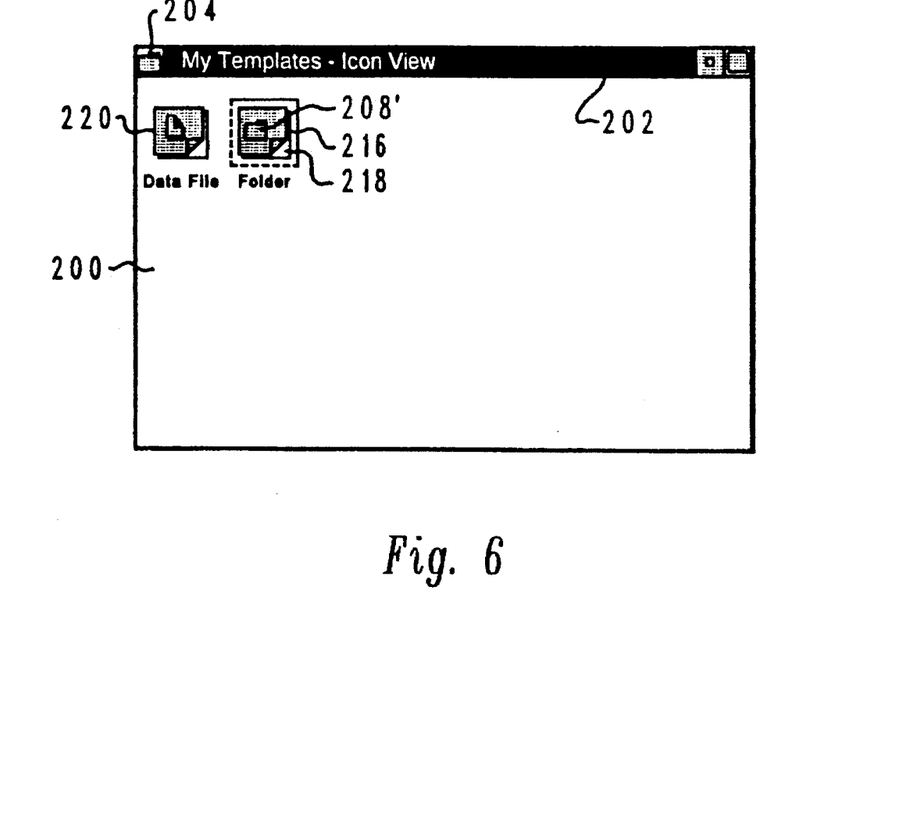
FIG. 6 is a screen representation of a template folder including templates in accordance with the present invention.

When the user places the check mark in template check box 212, the visual appearance of folder 208 changes to the folder template icon representation shown in FIG. 6 as folder template 216.

The folder template icon includes a miniaturized version of the folder icon 208' situated within on a normal size icon 218 which resembles a pad of papers with the lower right corner of the top sheet turned up as shown.

Alternatively, if it were desired to create a data file template from data file 206, the template setting of data file 206 would be selected and checked as described above. In that case, the distinctive data file template icon 220 would be appear in window 200 as shown in FIG. 6. It is noted that data file template icon 220 and folder template icon 216 are readily distinguishable from the data file and folder icons from which they were created respectively.

FIG. 6, in summary, shows the same folder as FIG. 5 except in the state in which it would normally appear when ready for typical use. There are no open windows for the templates. The settings window, shown in FIG. 5, is opened only to alter the settings of template and need not otherwise be opened.

Figure 7:
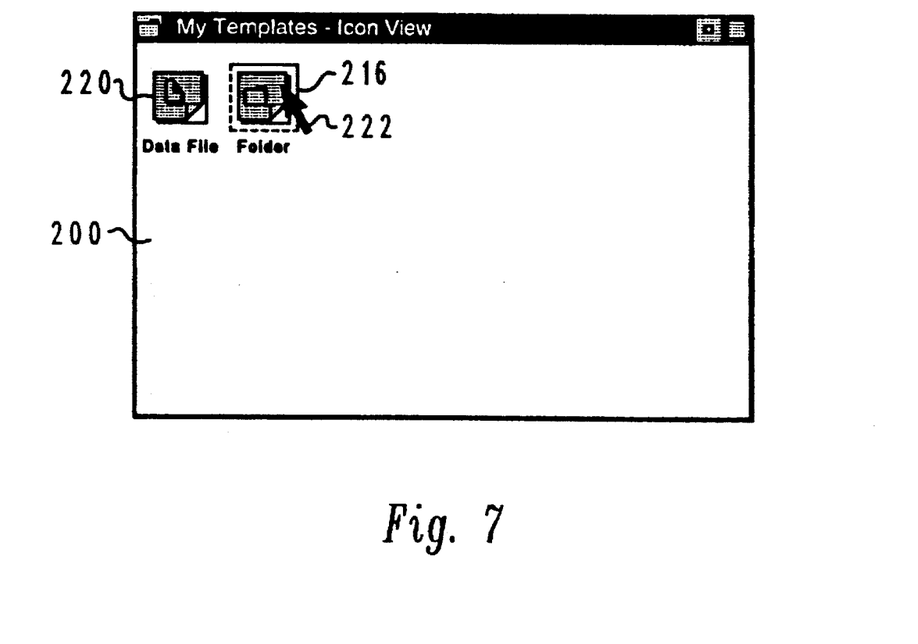
FIG. 7 is a screen representation of a template folder including templates and showing a pointer.
Figure 8:
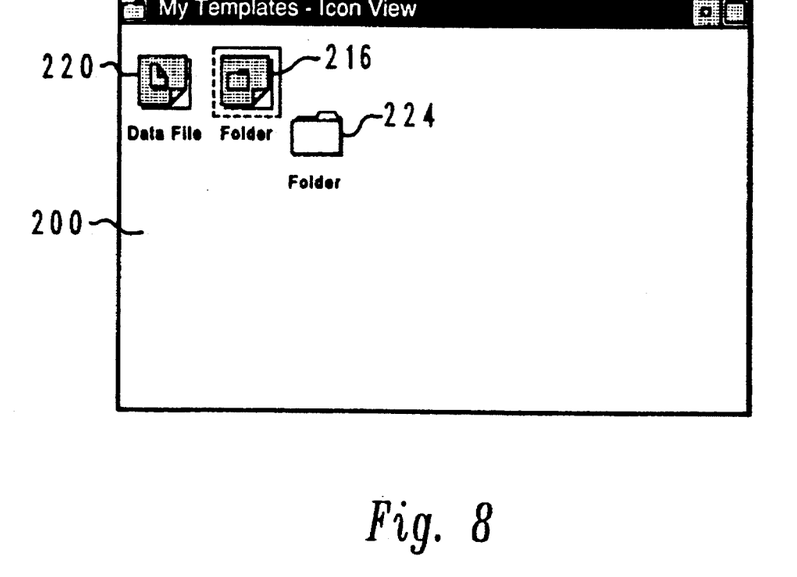
FIG. 8 is a screen representation of a folder being created with the "drag-create" feature of the present invention.

Additional objects are created from templates 216 and 220 in the manner now described. For example, to create an folder object with the same contents and properties as folder template 216, the pointer 222 is placed on folder template 216 as shown in FIG. 7. The user then clicks on template 216 and attempts to drag the icon of template 216. As soon as pointer 222 moves off template icon 216, pointer 222 changes to a folder icon 224 as shown in FIG. 8. The computer operating system then stores a file in the computer which contains all of the contents and properties of folder template 216 such that the contents and properties are retrievable whenever the user clicks on folder 224.

Figure 9:
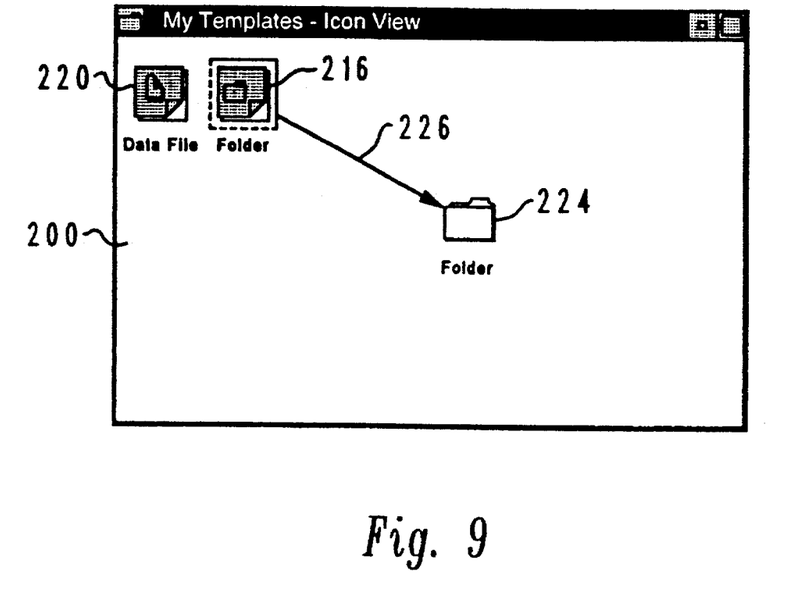
FIG. 9 is a screen representation of a folder created with the "drag-create" feature of the present invention and showing the direction of the pointer drag action.

The user continues dragging folder 224 in a direction indicated by arrow 226 in FIG. 9 to a desired location within window 200. The term "drag-create" is a short-hand notation for the above described feature of the present invention.

FIGS. 7, 8 and 9, in summary, show a direct mouse manipulation action on the folder template. As the template is dragged, the pointer changes to that of the folder in its non-template form. When the folder is dropped, a new instance is created at the position of the drop. This example shows that the folder was drag-created in the same folder as the template. The new object is created using the same class, data, and properties as the template that was dragged. Although the drag of the template will create new instances, pressing the Shift key down while dropping a dragged template will move it. Similarly, holding the Ctrl key down will copy it.

Figure 10:
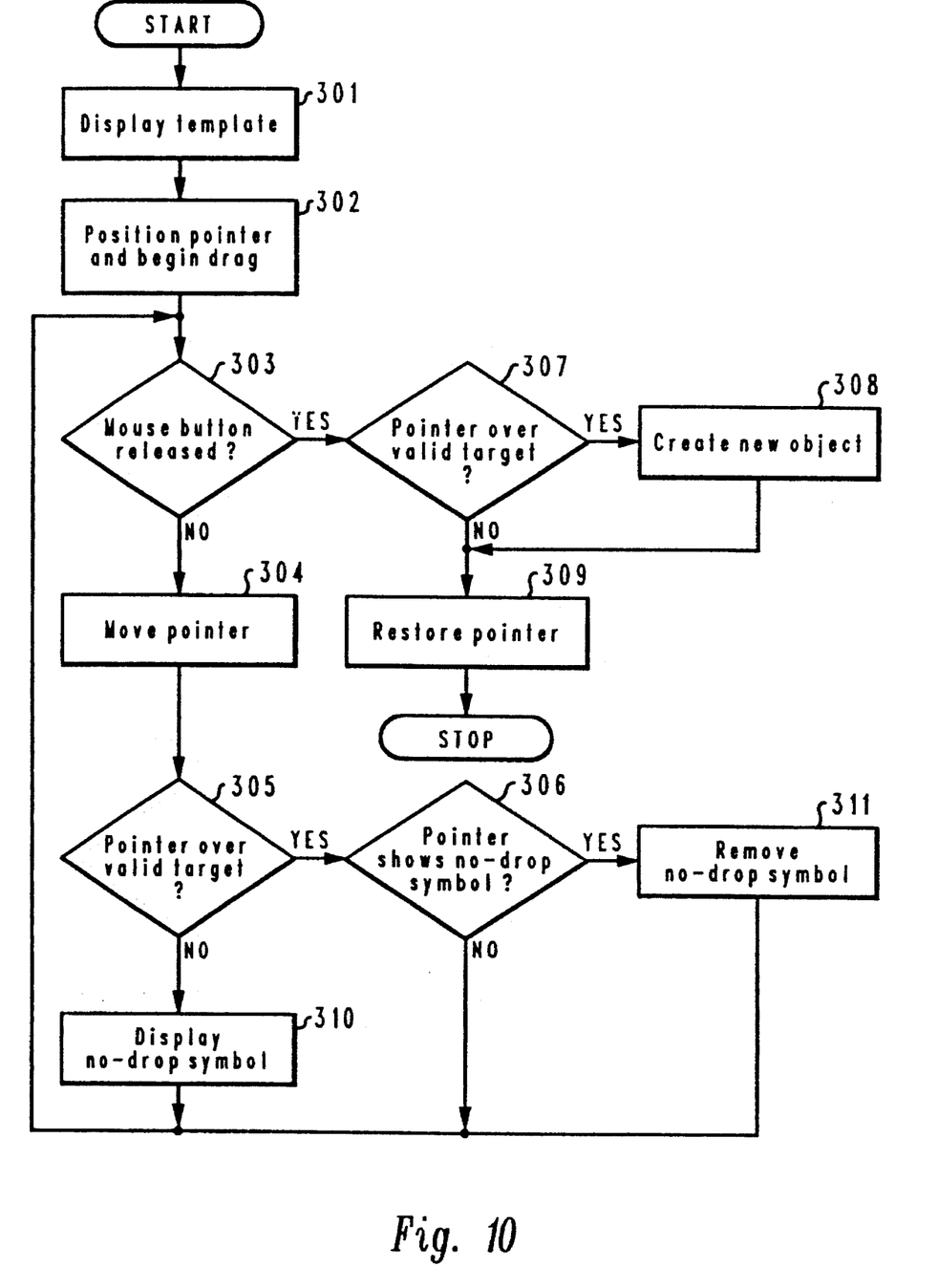
FIG. 10 is a flowchart depicting the operation of the method of the present invention.

FIG. 10 is a flowchart which summarizes the operation of the method of the present invention on computer 10. The operation starts by displaying a template, than is, a folder is opened which displays a template form of an object as per block 301. In one embodiment of the invention, the template appears as an icon looking like a colored pad of paper with a miniature icon, representing the objects class, data, settings, superimposed in top of it.

A drag-create operation is initiated by positioning the pointer over the template and pressing the drag mouse button as per block 302. When the mouse is moved while the drag button is depressed, the drag operation is in progress. When the drag of a template is initiated, the pointer is changed to the icon corresponding to the object which the template represents, and not that of the whole template.

A test is then conducted at decision block 303 to determine if the mouse button is released. Moving the mouse pointer or releasing the drag mouse button are the valid mouse actions while a drag operation is in progress. If the mouse button is released, processing continues with decision block 307, discussed later. Otherwise, process flow continues to the move pointer block 304. As long as the mouse drag button is not released, the user is free to position the mouse over potential targets for the drop.

A test is conducted at decision block 305 to determine if the pointer is over a valid target. The area under the mouse pointer is the potential target for the drop. If the potential target of the drop is valid, ie. the object can be created in that folder, then processing continues with block 306. Otherwise processing continues with block 310, discussed later.

At block 306 a determination is made to see if the pointer shows a no-drop symbol. The area under the mouse pointer is a valid target for the drop. If the area previously under mouse pointer was not a valid target, processing continues with step 311. Otherwise control flows back to block 303 at which a mouse event is again awaited as seen in FIG. 10.

Returning to decision block 307, a determination is made to see if the mouse pointer is over a valid target. It is again noted that the area under the mouse pointer is the potential target for the drop. If the potential target of the drop is valid, ie. the object can be created in that folder, then processing continues with block 308 at which a new object is created. Otherwise, process flow continues with block 309, discussed later. At block 308, a new object is created. The drop has completed and a new object is created with the same class, data and settings of the template being dragged. The new object is created in the folder directly under the mouse pointer and is positioned in the folder where the mouse pointer was at the time of the drop.

Returning now to block 309, the restore pointer block, the drag/drop operation has been completed and the pointer is restored to the state that it was in prior to commencement of the drag. In other words, the pointer is restored to the size and shape it exhibited prior to step 302.

At step 310 a no-drop symbol is displayed. The folder under the mouse pointer is not a valid target in which to create a new instance of the object being dragged. To indicate this condition, a no-drop symbol is superimposed over the mouse pointer symbol. Process flow then continues back to block 302 where further mouse action is awaited.

Returning to block 311, the no-drop symbol is removed. Although the previous drag target was invalid, the current drag target is valid and the no-drop symbol is removed. Process flow then continues back to block 302 where further mouse action is awaited.

The foregoing has described a method of providing a template to a graphical user interface by supplying a visual cue to the template and by supplying a direct template manipulation action to produce a metaphor which significantly increases the ease by which users can create objects. The above described visual cue is provided to distinguish an instance of an object from its template form. Any object of any class which contains data and settings can be made into a template by turning on its template setting. When an object becomes a template, the icon which represents it is immediately altered. In particular, its icon becomes miniaturized or scaled down and superimposed on top of a normal size icon which resembles a pad of sheets of paper, such pad having a predetermined color. This metaphor is used to symbolize a stack of objects, of which new objects can be peeled off the top of the stack. With a drag and drop mouse action, a new object can be picked off of a template stack and dropped into any folder. A new object of the class, data and settings defined by the template will be created in the folder at the mouse position at the time of the drop While the invention has been illustrated in connection with a preferred embodiment, it should be understood that many variations will occur to those of ordinary skill in the art, and that the scope of the invention is defined only by the claims appended hereto and equivalent.

We claim:

1. A method for providing a template in a computer system graphical user interface, said method comprising the steps of:

creating an object within said computer system, said object having a plurality of desired properties and associated data stored in a memory within said computer system;

displaying a graphic representation of said object on a display screen in the form of a first icon;

designating said object as a template in response to a user input to said computer system;

in response to said designation of said object as a template, storing in a memory within said computer system said plurality of desired properties of said object and said associated data in association with said template;

displaying said first icon within a template icon within said display screen in response to said designation of said object as a template, said template icon providing a visual indication of the availability of multiple copies of said object represented by said first icon; and thereafter, creating multiple copies of said object within said computer system which each includes said plurality of desired properties and said associated data in response to a user manipulation of said template icon.

2. The method for providing a template in a computer system according to claim 1, wherein said step of creating multiple copies of said object which each includes said plurality of desired properties in response to user manipulation of said template icon further comprises the steps of:

selecting said template icon by placing a pointer on said template icon with a pointing device;

dragging said template icon with said pointer; and displaying a second icon identical to said first icon on said display screen at a point where a user drops said template icon.

3. The method for providing a template in a computer system according to claim 1, wherein said step of designating said object as a template in response to a user input to said computer system comprises the steps of:

opening a settings window for the object; and setting a template property on the object through the settings window.

4. A system for providing a template in a computer system graphical user interface, said system comprising:

means for creating an object within said computer system, said object having a plurality of desired properties;

means for displaying a graphic representation of said object on a display screen in the form of a first icon;

means for designating said object as a template in response to a user input to said computer system;

means for storing in a memory within said computer system said plurality of desired properties of said object in response to said designation of said object as a template;

means for displaying said first icon within a template icon within said display screen in response to said designation of said object as a template, said template icon providing a visual indication of the availability of multiple copies of said object represented by said first icon; and means for thereafter, creating multiple copies of said object within said computer system which each includes said plurality of desired properties in response to a user manipulation of said template icon.

5. The method for providing a template in a computer system according to claim 1, wherein said object comprises a folder.

* * * * *